(12) United States Patent
Feigenblum et al.

(10) Patent No.: US 7,679,036 B2
(45) Date of Patent: Mar. 16, 2010

(54) METHOD AND DEVICE FOR INDUCTIVELY HEATING CONDUCTIVE ELEMENTS IN ORDER TO SHAPE OBJECTS

(75) Inventors: Jose Feigenblum, Grenoble (FR);
Gerard Legerot, Aix les Bains (FR);
Alexandre Guichard, La Chapelle du Mont (FR)

(73) Assignee: Roctool, Le Bourget du Lac (FR)

( * ) Notice: Subject to any disclaimer, the term of this patent is extended or adjusted under 35 U.S.C. 154(b) by 422 days.

(21) Appl. No.: 10/588,624

(22) PCT Filed: Mar. 18, 2005

(86) PCT No.: PCT/FR2005/050176

§ 371 (c)(1),
(2), (4) Date: Aug. 4, 2006

(87) PCT Pub. No.: WO2005/094127

PCT Pub. Date: Oct. 6, 2005

(65) Prior Publication Data

US 2007/0267405 A1    Nov. 22, 2007

(30) Foreign Application Priority Data

Mar. 18, 2004    (FR) .................................. 04 50541

(51) Int. Cl.
*H05B 6/10* (2006.01)
(52) U.S. Cl. ...................... 219/635; 219/634; 219/615; 428/409; 148/520
(58) Field of Classification Search ................. 219/618, 219/633–635, 647, 649, 672, 674, 676, 615; 425/174–175; 264/403; 148/520; 428/409
See application file for complete search history.

(56) References Cited

U.S. PATENT DOCUMENTS 4,197,441 A * 4/1980 Rudd .......................... 219/612

(Continued)

FOREIGN PATENT DOCUMENTS

FR    2 816 237    5/2002

(Continued)

OTHER PUBLICATIONS

International Search Report Jan. 9, 2007.

(Continued)

*Primary Examiner*—Quang T Van
(74) *Attorney, Agent, or Firm*—RatnerPrestia

(57) ABSTRACT

The invention relates to a method and a device which are used to heat materials in order to produce objects industrially, especially by mass production, and which allow a large variety of transformation methods.

20 Claims, 4 Drawing Sheets

U.S. PATENT DOCUMENTS

| | | | |
|---|---|---|---|
| 4,439,492 A | | 3/1984 | Wada et al. |
| 4,622,445 A | * | 11/1986 | Matsen ........................ 219/615 |
| 5,483,043 A | * | 1/1996 | Sturman et al. ............. 219/647 |
| 5,571,437 A | * | 11/1996 | Rudd .......................... 219/607 |
| 5,808,281 A | | 9/1998 | Matsen et al. |
| 6,043,469 A | | 3/2000 | Fink et al. |
| 6,619,940 B1 | | 9/2003 | Wang et al. |
| 6,864,419 B2 | | 3/2005 | Lovens |
| 2002/0003011 A1 | * | 1/2002 | Dykstra et al. .............. 148/520 |
| 2004/0041303 A1 | | 3/2004 | Kim et al. |
| 2004/0058027 A1 | | 3/2004 | Guichard et al. |
| 2005/0035115 A1 | | 2/2005 | Anderson et al. |

FOREIGN PATENT DOCUMENTS

| | | |
|---|---|---|
| FR | 2 867 939 | 9/2005 |
| JP | 57 1993340 | 11/1982 |

OTHER PUBLICATIONS

Guichard Alex and Feigenblum Jose, High Speed Processing Using Electromagnet Induction, JEC Composites, Aug.-Sep. 2004, pp. 94-96.

Office Action dated Apr. 10, 2009.

* cited by examiner

METHOD AND DEVICE FOR INDUCTIVELY HEATING CONDUCTIVE ELEMENTS IN ORDER TO SHAPE OBJECTS

The present invention pertains to a method for heating materials in order to produce objects and to a device using such a method.

BACKGROUND

The production of objects industrially, especially by mass production, is an operation of growing importance, which concerns all areas of economic activity, for example, the areas of the automobile industry, the aerospace industry, the aviation industry, acoustics, furnishing and plumbing, construction and public works, health care and also in the area of large consumer goods, such as luggage or toys.

In general, quasi any industrial activity or service requires the use of objects that, being specific to the particular activity, must be produced in large numbers, preferably at a limited cost.

The production of such objects can also involve operations whose nature is so diverse and varied as, for example, shaping, molding, molding from a casting, local consolidation, insertion, assembly, welding, cutting, protection or covering ("coating" in English) or decoration operations.

Finally, such production must be able to take into account materials as diverse as thermoplastic compositions, thermosetting compositions, cellular compositions, elastomers and/or vulcanizable compositions, glass or light alloys, which are, for example, reinforced with (glass, carbon, natural, etc.) fibers and/or have a sandwich structure and/or a honeycomb structure.

To limit the investment and operating costs of the production of a large number of objects, it is expedient to use a production method that utilizes electromagnetic induction phenomena to heat the materials for molding them or for not molding them.

According to such a method, a molding device 100 (FIG. 1) comprises inductors 102 that transmit an electric current that generates a magnetic field (not shown) such that the Foucault currents propagate in a conductor element, such as a metal, 104, located in the vicinity of the inductors 102.

These Foucault currents bring about a temperature rise of the conductor element 104, which transmits its heat, by conduction, to a material 106 to be molded, which is placed on its surface 105.

This conduction, or heat transfer, represented by arrows 103 in FIG. 1, now makes it possible to bring the material 106 to the desired temperature to carry out the molding thereof.

The present invention results from the observation that a method according to the prior art, such as that described by means of FIG. 1, has numerous drawbacks.

In fact, such a method requires the heating of the entire conductor element 104, even though only its surface 105, which is in contact with the material 106 to be molded, requires a rise in temperature.

In other words, the quantity of energy that must be supplied to raise the temperature of the material 106 corresponds to the male and/or female shapes of the objects to be produced.

SUMMARY OF THE INVENTION

To remedy at least one of these shortcomings, the present invention pertains to a method for heating materials in order to produce objects industrially, especially by mass production, limiting the investment and operating costs and permitting a great variety of transformation methods, said method comprising the following steps:

The step of generating electromagnetic fields by means of inductors through which electric currents of a suitable intensity and frequency flows, the step of applying the electromagnetic fields to at least part of at least one intermediate element, comprising an internal face and an external face, located between said inductors and said materials to be heated, said inductors and said intermediate element being shaped such that the electric currents induced in said intermediate element by the electromagnetic fields circulate on the surface of at least one so-called heating zone of said external and internal faces, said heating zone being intended to be at the interface with the materials to be heated, one of the parts of each intermediate element including said heating zone made of a material having a magnetic permeability and/or an electric resistivity different from those of the rest of the intermediate element.

Due to a method according to the present invention, the rise in temperature required for the production of an object may be limited only to the surface of the intermediate element acting as a support for the material to be heated, and to this material, such that this heating method requires a lower energy consumption compared to a method according to the state of the art. It is noted that it would also be possible to consider the use of an intermediate element formed by a single material.

Moreover, the temperature rise of the surface of the intermediate element is not linked exclusively with the thermal diffusivity of the intermediate element, which increases the reproducibility and the reliability of the method.

Such a method also has the advantage of permitting a circulation of current, which improves the homogeneity of heating on the entire surface of the intermediate element, such that the heating of the materials in contact with this intermediate element takes place just as homogeneously, permitting the presence of internal stresses to be limited in this material.

Another advantage of the present invention is the fact that it makes it possible to obtain different temperatures on the surface of the intermediate element, combining subparts of distinct natures (in terms of electric resistivity, magnetic permeability and at a lower level of thermal diffusivity), the temperature of each of these subparts being homogeneous.

The present invention also has the advantage of greatly reducing the durations of the thermal (heating/cooling) cycles because the heated mass is limited in thickness, which makes it possible to heat a larger number of materials in a given time.

According to another advantage of the present invention, it appears that a same structure of inductors can be used independently from the shape of the material to be heated. In other words, the same device can be used to heat different shapes of materials, which simplifies its use while reducing the cost of each heating operation because preliminary tests aimed at determining the optimal structure of the inductors are not necessary.

In one embodiment, said method comprises, in addition, the step of providing an insulating electric interruption in said intermediate element, such that the electric currents induced in said intermediate element by the electromagnetic fields circulate on the surface of said external and internal faces.

According to one embodiment, said interruption permits the intermediate element to be segmented into two subelements, at least one of these subelements comprising a heating zone formed by the parts of the intermediate element having a magnetic permeability and/or a specific electric resistivity.

In one embodiment, the intermediate element comprises two subelements that are mobile relative to one another.

According to one variant, the method is divided into a first phase, during which the inductors and said intermediate element are shaped such that the electric currents induced in said intermediate element by the electromagnetic fields circulate on the surface of at least one so-called heating zone of said external and internal faces, said heating zone being intended to be at the interface with the materials to be heated, followed by a second phase, during which, after the two mobile subelements have been brought into contact with one another in such a way as to hermetically close a space and after injection of the materials to be heated into said space, said inductors and said intermediate element are shaped such that the electric currents induced in said intermediate element by the electromagnetic field circulate on the surface of the external face, continuing to heat the heating zone by conduction.

According to one embodiment, said inductors are composed of plug-in parts surrounding said intermediate elements.

In one embodiment, said part of each intermediate element having a magnetic permeability and/or an electric resistivity different from those of the rest of the intermediate element comprises a magnetic compound having a Curie temperature close to the temperature of the material to be heated, for example, comprising Nickel, Chromium and/or Titanium.

According to one embodiment, the intermediate element comprises a material having low temperature rise under the effect of the Foucault currents.

In one embodiment, the interface of the heating zone with the materials to be heated is made by contact. The heating zone may be coated with a layer of insulating material.

In one variant, the heating zone being a radiating zone, the interface of the heating zone with the materials to be heated is embodied by bringing the materials to be heated into the proximity.

The present invention also pertains to a device for heating the materials in order to produce objects industrially, especially, by mass production, limiting the investment and operating costs, permitting a great variety of transformation methods, said device comprising:

generators of electric currents of a suitable intensity and of a suitable frequency, which supply the inductors and generate the electromagnetic fields, means for applying the electromagnetic fields to at least part of at least one intermediate element, comprising an internal face and an external face, located between said inductors and said materials to be heated, said inductors and said intermediate element being shaped such that the electric currents induced in said intermediate elements by the electromagnetic fields circulate on the surface of at least one heating zone of one of said external and internal faces, said heating zone being intended to be located at the interface with the material to be heated, one of the parts of each intermediate element including said heating zone made of a material having a magnetic permeability and/or an electric resistivity different from those of the rest of the intermediate element.

In one embodiment, said device comprises, in addition, an insulating electric interruption in said intermediate element, such that the electric currents induced in said intermediate element by the electromagnetic field circulate on the surface of at least one of said external and internal faces.

According to one embodiment, said interruption permits the intermediate element to be segmented into two subelements, at least one of said subelements comprising a heating zone formed by the parts of the intermediate element having a specific magnetic permeability and/or a specific electric resistivity.

In one embodiment, the intermediate element comprises two subelements that are mobile in relation to one another.

According to one embodiment, said inductors are composed of plug-in parts surrounding said intermediate elements.

In one embodiment, said part of each intermediate element having a magnetic permeability and/or an electric resistivity different from those of the rest of the intermediate element comprises a magnetic compound having a Curie temperature, comprising, for example, Nickel, Chromium and/or Titanium.

According to one embodiment, the intermediate element comprises a material having little temperature rise under the effect of Foucault currents.

In one embodiment, the interface of the heating zone with the material to be heated is made by contact. The heating zone may be coated by a layer of an insulating material.

In one variant, the heating zone being a radiating surface, the interface of the heating zone with the materials to be heated is made by bringing the materials to be heated into proximity.

The present invention also pertains to a mold for heating the materials in order to produce objects industrially, especially by mass production, limiting the investment and operating costs and permitting a great variety of transformation methods, said mold comprising:

generators of electric currents of a suitable intensity and of a suitable frequency, which supply the inductors and generate the electromagnetic fields, means for applying the electromagnetic fields to at least part of at least one intermediate element, comprising an internal face and an external face, located between said inductors and said materials to be heated, said inductors and said intermediate element being such that the electric currents induced in said intermediate element by the electromagnetic fields circulate on the surface of one of said external and internal faces, one of the parts of each intermediate element made of a material having a magnetic permeability and/or an electric resistivity different from those of the rest of the intermediate element.

In one embodiment, said mold comprises, in addition, an insulating electric interruption in said intermediate element such that the electric currents induced in said intermediate element by the electromagnetic fields circulate on the surface of said external and internal faces.

According to one embodiment, said interruption permits the intermediate element to be segmented into two subelements, at least one of said subelements comprising a heating zone formed by the parts of the intermediate element having a specific magnetic permeability and/or a specific electric resistivity.

In one embodiment, the intermediate element comprises two subelements that are mobile in relation to one another.

According to one embodiment, said inductors are composed of plug-in parts surrounding said intermediate elements.

According to one embodiment, said part of each intermediate element has a magnetic permeability and/or an electric resistivity different from those of the rest of the intermediate element, comprising a magnetic compound having a Curie temperature, for example, containing Nickel, Chromium and/or Titanium.

According to one embodiment, the intermediate element comprises a material having little temperature rise under the effect of the Foucault currents.

In one embodiment, the interface of the heating zone with the materials to be heated is made by contact. The heating zone may be coated with a layer of an insulating material.

In one variant, the heating zone being radiating, the interface of the heating zone with the materials to be heated is made by bringing the materials to be heated into proximity.

The present invention also pertains to a part of an intermediate element used in a method in accordance with one of the above embodiments in a device in accordance with one of the above embodiments or in a mold in accordance with one of the above embodiments, said part being composed of a material having a magnetic permeability and/or an electric resistivity different from those of the rest of the intermediate element.

Finally, the present invention also pertains to an object produced by heating materials industrially, especially by mass production, limiting the investment and operating costs and permitting a great variety of transformation methods, said object being obtained by a method according to one of the above embodiments, by means of a device according to one of the above embodiments and/or by means of a mold according to one of the above embodiments.

BRIEF DESCRIPTION OF THE DRAWINGS

Other characteristics and advantages of the present invention will appear from the description of embodiments of this invention, which is given below as an illustrative and nonlimiting description, with reference to the attached figures, in which FIG. 1, already described, shows a method of heating materials according to the prior art.

DETAILED DESCRIPTION OF INVENTION

Figure 1:
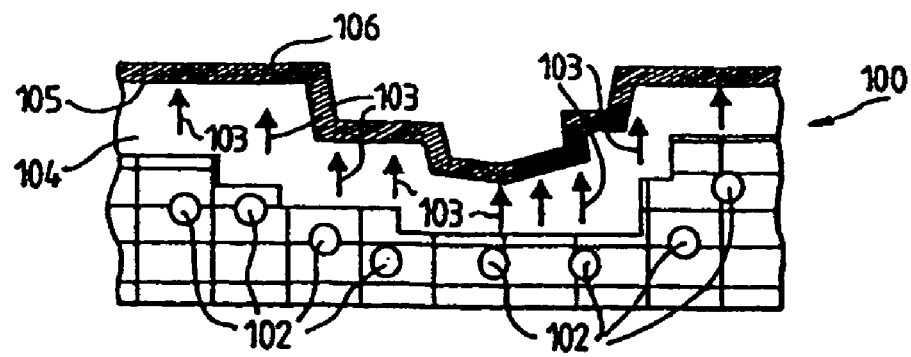
Figure 2A:
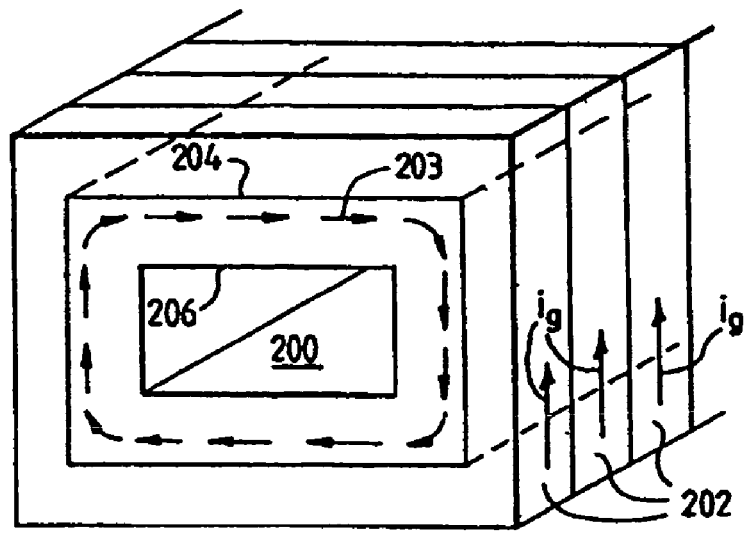
FIGS. 2a and 2b show schematic diagrams of the present invention.

FIG. 2a shows an intermediate element 200 made of a conductive material such as a metal, surrounded by inductors 202 through which a current ig flows, which can generate Foucault currents 203 in the intermediate element 200.

The Foucault currents 203 propagate over the exterior surface 204 or the interior surface 206 of the intermediate element 200 as a function of the implantation of the inductor in relation to the intermediate element.

Thus, when the inductor is located in the interior and on the exterior of the intermediate element, the Foucault currents circulate over the interior surface and the exterior surface, respectively, of the intermediate element.

In this example, the currents 203 shown propagate on the exterior surface 204 of the intermediate element 200.

According to an observation proper to the present invention, it now appears possible to heat the surface of a material directly by arranging this material on the surface of the intermediate element 200 through which the Foucault currents 203 flow, this material being in contact with part of the intermediate element, whose temperature rise is due mainly to the phenomenon of resistivity.

Such a heating method can be controlled by determining the necessary characteristics of the Foucault currents 203 (voltage, intensity) by means of a magnetic field generated by the inductors having adapted characteristics and especially an adapted frequency, and it is possible to determine the thickness over which the current circulates on the surface of the intermediate element.

Figure 2B:
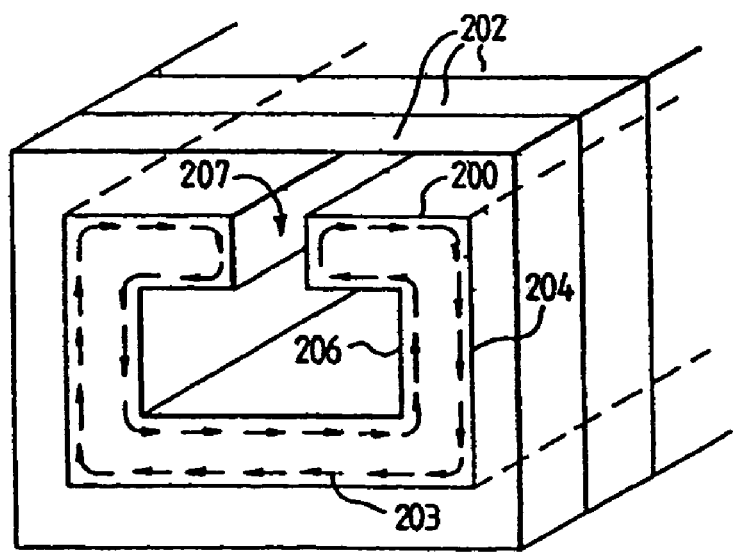

According to another observation proper to the present invention, when a gap 207 (FIG. 2b) is located in the intermediate element 200, the Foucault currents 203 propagate along the internal and external surfaces of this intermediate element in such a way as to form a closed circuit.

The presence of this gap 207 permits the material to be heated on each of the surfaces of the intermediate element, as described above.

Figure 3A:
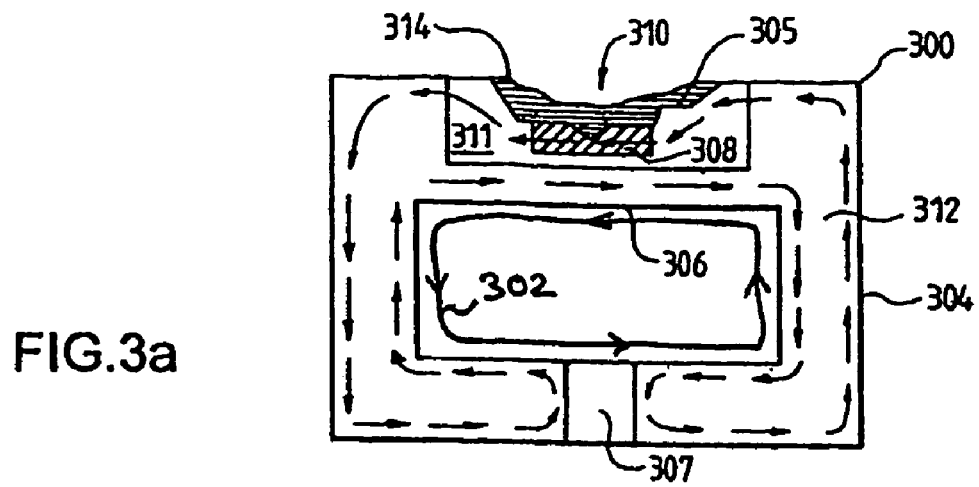
FIGS. 3a and 3b show devices according to a first embodiment and a second embodiment of the present invention.

In one embodiment of the present invention (FIG. 3a), a mold 310 is designed such that the material to be heated is located on an exterior surface 304, 305 of the intermediate element 300 being considered.

The inductors 302 generate magnetic fields inducing Foucault currents indicated by arrows. For example, and as is shown in the figure, these inductors are in the interior of the intermediate element. This variant has the advantage of permitting rapid positioning of the material to be heated on this surface 304, 305.

It should also be noted that for reasons of clarity, these inductors proper to the intermediate element 300 are not shown in FIGS. 3c and 3d, which will be described in detail later.

The gap 307 is also generated in this embodiment by an electric insulator such as, for example, a ceramic, thermoplastic or thermosetting compound, which makes it possible to prevent possible electric discharges at the gap 307.

The surface 305 of the heating part 311, intended to be in contact with the material 314 to be heated, has a magnetic part 308 with a "Curie temperature" such that the temperature of this part 308 is limited by the Curie temperature, selected as a function of the material to be heated. The magnetic part with the Curie temperature may substitute in its entirety or in part for the intermediate element.

In other words, thanks to the use of such a material with a Curie temperature, the temperature of the surface of the part 308 can be maintained at a given temperature, distinct from that of the rest of the surface 305, which makes it possible to regulate the power supplied automatically.

Also, the part 312 of the mold that is not intended to be in contact with the material 314 to be heated is composed of a magnetic alloy, for example, aluminum or stainless steel grade 304, 304L, 316, which shows no temperature rise despite the presence of Foucault currents, thus making it possible to greatly limit the temperature rise of the subelement 312.

As was mentioned above among the advantages of the present invention, it appears that a device or a system according to the present invention makes it possible to heat the surface in contact with the material in times much shorter than the time required by a method according to the prior art.

According to a concrete example, a temperature of 250° C. can be reached in a few seconds, whereas the corresponding time is much longer in case of a method according to the prior art because the energy is never injected at the mold/material interface.

Figure 3B:
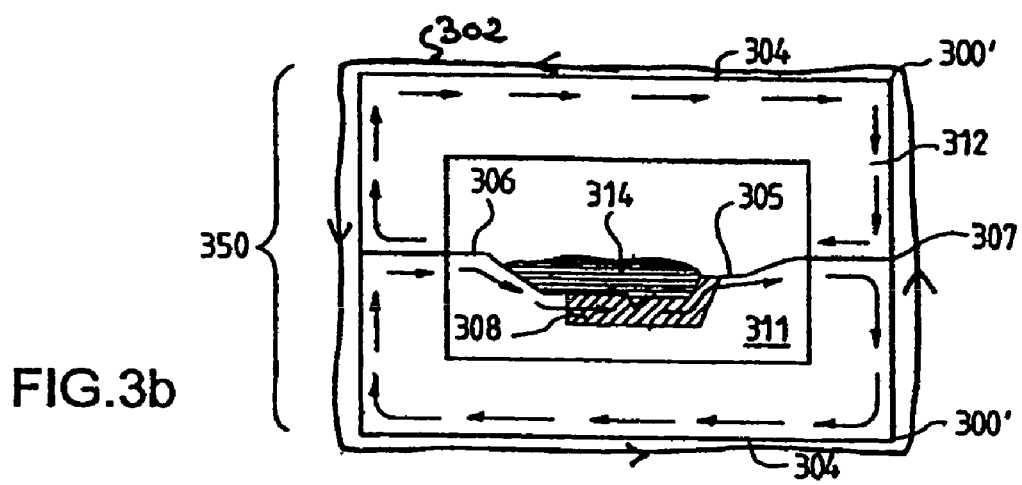

According to a second preferred embodiment of the present invention, described on the basis of FIG. 3b, the heating surface corresponds to surface 306 located in the interior of the intermediate element 350, which makes it possible, for example, to apply strong mechanical pressure on the material 314 being heated. The inductors 302 make it possible to generate Foucault currents in the intermediate element.

Figure 3C:
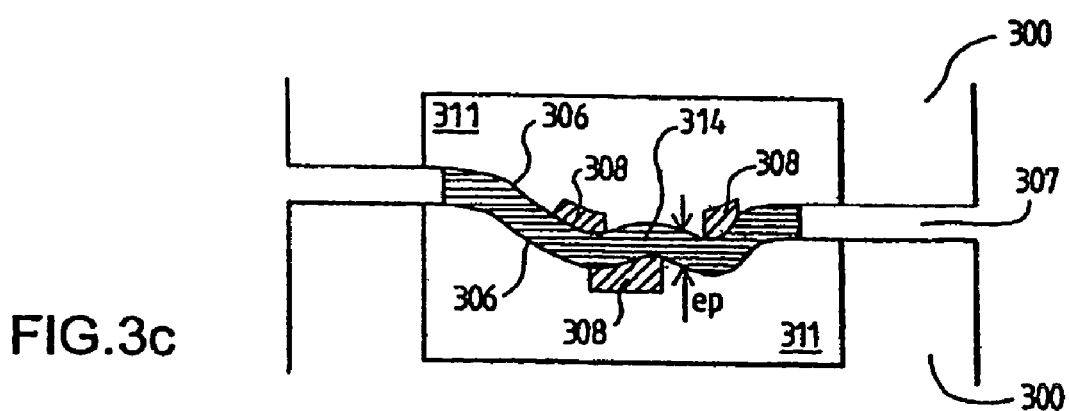
FIGS. 3c and 3d show a detail view of the second embodiment.

This embodiment uses two intermediate subelements 300', arranged opposite each other, which has the advantage of making it possible to use the heated material to define a gap at each of its intermediate subelements, as is shown in FIG. 3c, which is a detail of FIG. 3b, which shows the internal surfaces 306 of each intermediate subelement 300' as well as the material 314 to be heated.

Figure 3D:
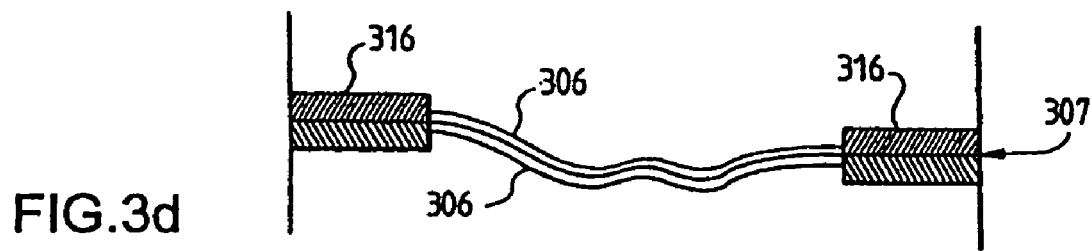

It is apparent that in this case, the thickness of the material to be heated defines the thickness of the gap, whereas, in a variant shown in FIG. 3d, the thickness of the gap is determined by the stops 316, which are transparent to the fields, which makes it possible to produce objects of a predetermined thickness.

As the material to be molded is in contact on each of its faces with a surface of the tool called the molding or heating zone, a circulation of electric current is generated on the two molding surfaces. In case of transformation of electrically conductive composite materials (based, for example, on carbon fibers), the material can bring about a short-circuit between the two current circulations, thus generating degradation of the material locally.

Figure 4A:
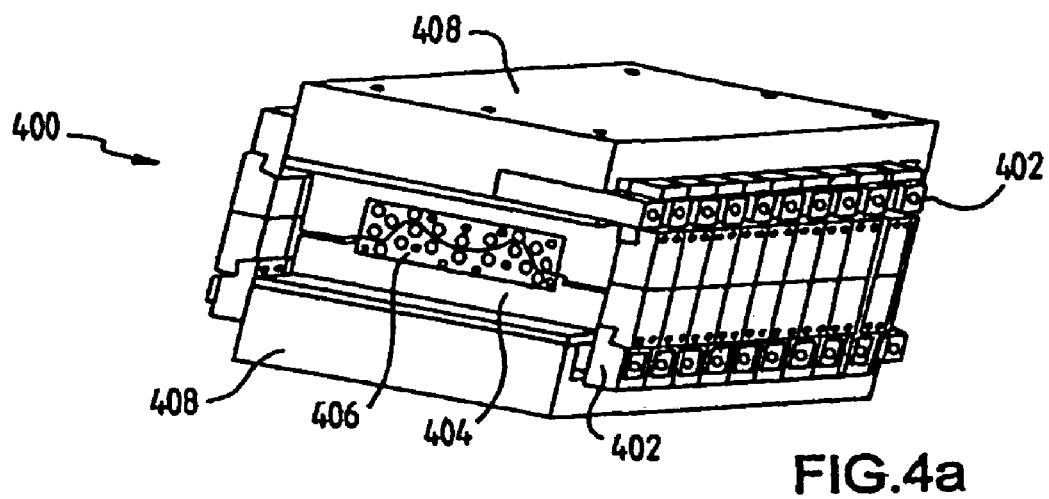
FIGS. 4a and 4b show a perspective view and an exploded view of a mold according to the present invention.
Figure 4B:
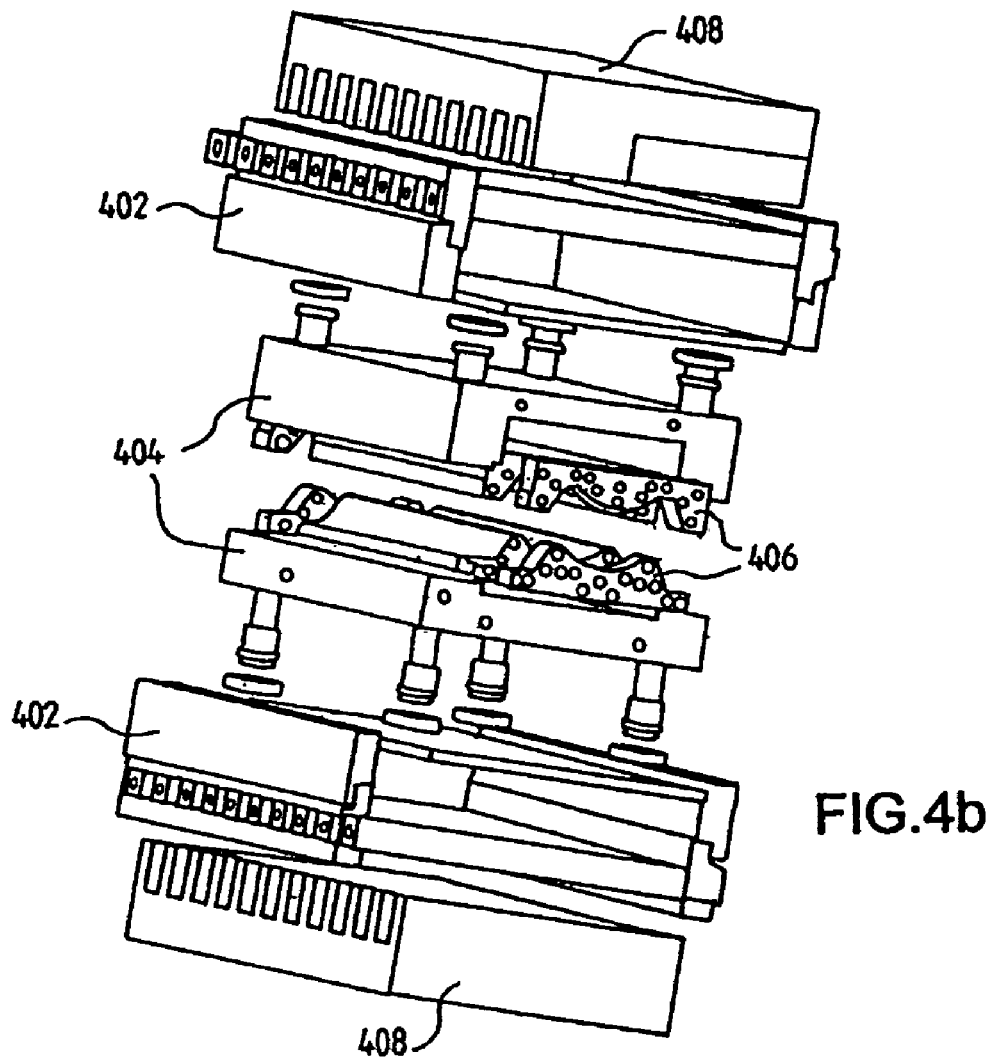

To avoid the appearance of this phenomenon, it is proposed that an electrically insulating layer be prepared on at least one of the two molding zones. The composition of this layer may vary, using materials of the type of teflon, PEEK [Polyaryl Ether Ether Ketone], amorphous carbon, glass fibers, etc. The principal properties of this layer are:

A temperature resistance at least equal to the transformation temperature of the material to be molded, a mechanical strength at least equal to the transformation pressure of the material to be molded, electric insulation, fine layer (a few µm), industrial deposition method compatible with the alloys forming the molding zones, FIG. 4a shows a perspective view of a mold according to the second embodiment described on the basis of FIG. 3b, whereas FIG. 4b shows an exploded perspective view of this mold 400.

Thus, FIG. 4a shows the inductors 402 which surround a frame 404 of standard design in which is located part 406 of the mold that comes into contact with the material to be heated (not shown).

The exploded view of the mold 400 in FIG. 4b makes it possible to show the detachable structure of the inductors 402 and of the pressing members 408, which make it possible to subject the material to be heated to high pressure while maintaining the inductors.

It should be noted that in order not to disturb the inductors 402, the pressing members 408 are made of a compound transparent to the fields.

The present invention can be extended to various applications, two of which are shown below.

The electromagnetic principle according to the present invention can be used to heat the material to be transformed by radiation. The electromagnetic principle is identical but the circulation of the Foucault currents has the objective of raising the temperature of the graphite elements. Brought to a high temperature (up to ~1,000° C., these graphic elements heat the composite material located in the gap between the graphic elements by radiation without contact.

This method could replace the classical infrared heating methods, for example, in tube and tank manufacturing methods by wire wrapping on a rotating coil or in windshield manufacturing by gravity on convex molds, or even for preheating materials before their transformation.

Figure 5A:
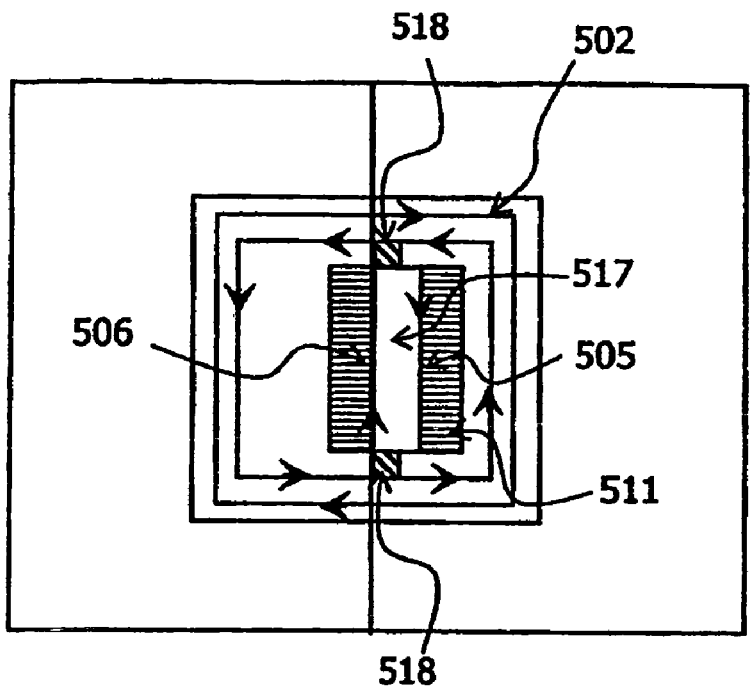
FIGS. 5a and 5b show the two phases of a particular application of the present invention.

The principle according to the present invention may also be used to heat the tools in bulk. However, in case of injection (of thermoplastics or thermosetting plastics), the pressures are such that the tools must be closed. It is now proposed that heating be carried out in two phases:

In a first phase, illustrated in FIG. 5a, in which surface heating of the tools is performed by the method described in this patent, generated by the presence of a gap 517 that can be embodied by means of a wedge or wedges 518 transparent to the fields. In this phase, the gap generated has the ability to make possible the circulation of current on each molding surface 505, 506 of the two parts of the tools. To accentuate the surface heating effect, a high-frequency current is used. Heating is carried out under vacuum in a very short time on the order of magnitude of a few seconds. The molding zones 511 are made of a magnetic material, whereas the rest of the intermediate element consists of a non-magnetic material, as is the external part, which is located beyond the inductor 502 advantageously immersed in an electric insulator, said external part playing a mechanical reinforcing role against high injection pressures.

Figure 5B:
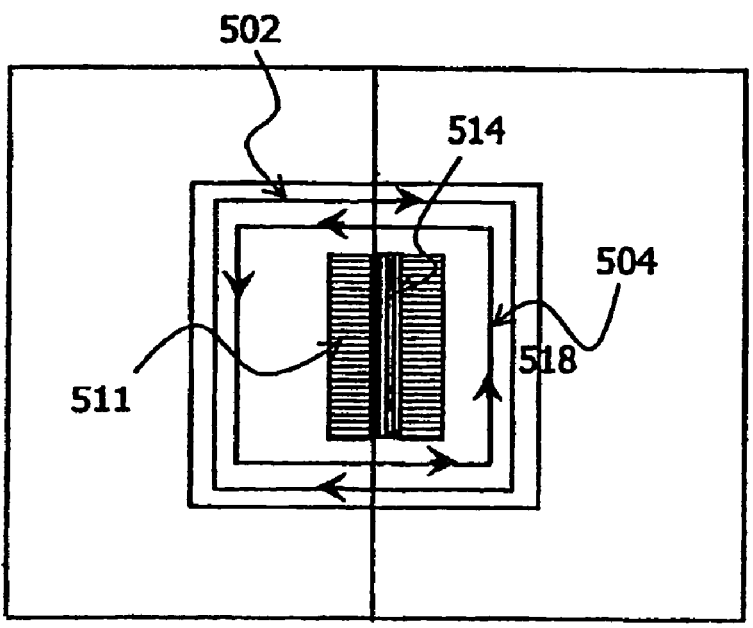

A second phase, illustrated in FIG. 5b, in which volume heating or bulk heating of the tools is carried out, obstructing the above gap. The tools are now closed during the injection of material 514. The currents can circulate on the periphery 504 of the tools only. To maintain the heating effect initiated during the first phase, a low-frequency (LF) current circulation is applied in this case to accentuate the skin thickness effect and thus to achieve heating in the core of the tools.

The principle is embodied, for example, with two inductors nested in one another, supplied by the same generator, which delivers either HF currents or LF currents.

The invention claimed is:

1. Method for heating materials in order to produce objects industrially, permitting a great variety of transformation methods, said method comprising:

generating electromagnetic fields by means of inductors through which electric currents of a predetermined intensity and of a predetermined frequency flow, applying said electromagnetic fields to two elements forming a mold located opposite each other, both being made of an electrically conductive material, at least one said element having a face forming a heating zone, said inductor means surrounding said two elements, said materials to be heated being placed between said two elements to be heated by said heating zone, arranging an insulating electric interruption or gap between said elements such that the electric currents induced by the electromagnetic fields circulate in a closed circuit in each said element, separating the two elements after heating the materials removing the materials.

2. Method in accordance with claim 1, in which said heating zone comprises a part of said corresponding element having a magnetic permeability and/or an electric resistivity different from those of the rest of said element.

3. Method in accordance with claim 1, in which said two elements are mobile in relation to one another.

4. Method in accordance with claim 3, said method being divided into a first phase, during which said inductors and said elements are shaped such that the electric currents induced in said elements by the electromagnetic fields circulate on said surface of said heating zone, said heating zone being located at the interface with said materials to be heated, followed by a second phase, during which, after the two mobile elements having been brought into contact in order to hermetically close a space and after injection of the materials to be heated into said space, said electric interruption between said two elements is inhibited.

5. Method in accordance with claim 1, said inductors comprising detachable and plug-in parts for surrounding said two elements.

6. Method in accordance with claim 1, in which a part of at least one said element having a magnetic permeability and/or an electric resistivity different from those of the rest of the corresponding element is provided, said part comprising an element made of a magnetic compound having a Curie temperature.

7. Method in accordance with claim 1, in which a part of at least one of said elements forming said heating zone is provided, said part having a magnetic permeability and/or an electric resistivity different from those of the rest of the corresponding element, the material forming said rest of said corresponding element containing a material showing little temperature rise under the effect of the Foucault currents.

8. Method in accordance with claim 1, in which the interface of said heating zone with said materials to be heated is made by contact in such a way as to carry out molding.

9. Method in accordance with claim 8, in which said heating zone is coated with a layer of an electrically insulating material.

10. Method in accordance with claim 1, in which said heating zone is radiating, the interface of said heating zone with the material to be heated being made by bringing the materials to be heated into proximity with said heating zone.

11. Device for heating materials in order to produce objects industrially, permitting a great variety of transformation methods, said device comprising:
  generators of electric currents of a predetermined intensity and of a predetermined frequency, supplying inductors and generating electromagnetic fields,
  a mold comprising two elements located opposite each other, both being made of an electrically conductive material, at least one element comprising a face forming a heating zone for heating a material placed between the two elements, said inductors surrounding said two elements,
  means for applying the electromagnetic fields to at least part of at least one of two elements and
  an insulating electric interruption or gap, being arranged between said elements such that the electric currents induced by the electromagnetic fields circulate in a closed circuit in each said element, and on said surface of said heating zone.

12. Device in accordance with claim 11, in which said heating zone comprises a part of said corresponding element having a magnetic permeability and/or an electric resistivity different from those of said corresponding element.

13. Device in accordance with claim 11, in which said two elements are mobile in relation to one another.

14. Device in accordance with claim 11, said inductors comprising detachable and plug-in parts for surrounding said two elements.

15. Device in accordance with one of the claim 11, in which at least one said element comprises a part having a magnetic permeability and/or an electric resistivity different from those of the rest of the corresponding element, said part comprising an element made of a magnetic compound having a Curie temperature.

16. Device in accordance with claim 11, in which at least one of said elements comprises a part forming said heating zone, said part having a magnetic permeability and/or an electric resistivity different from those of the rest of said element containing a material showing little temperature rise under the effect of the Foucault currents.

17. Device in accordance with claim 11, in which the interface of said heating zone with said materials to be heated is made by contact in such a way as to carry out molding.

18. Device in accordance with claim 17, said heating zone being coated with a layer consisting of an electrically insulating material.

19. Device in accordance with claim 11, in which said heating zone is a radiating zone, the interface of said heating zone with the material to be heated being made by bringing the materials to be heated into proximity with said heating zone.

20. Device in accordance with claim 11 wherein at least a part of at least one of the first and second elements is composed of a material having a magnetic permeability and/or an electric resistivity different from those of the rest of said element.

* * * * *